(12) United States Patent
Yumoto

(10) Patent No.: US 7,448,408 B2
(45) Date of Patent: Nov. 11, 2008

(54) CHECK VALVE

(75) Inventor: Hideaki Yumoto, Kakogawa (JP)

(73) Assignee: TLV Co., Ltd., Hyogo-ken (JP)

( * ) Notice: Subject to any disclaimer, the term of this patent is extended or adjusted under 35 U.S.C. 154(b) by 981 days.

(21) Appl. No.: 10/662,664

(22) Filed: Sep. 15, 2003

(65) Prior Publication Data

US 2004/0134540 A1   Jul. 15, 2004

(30) Foreign Application Priority Data

Sep. 13, 2002   (JP)   ............... 2002-268875

(51) Int. Cl.
*F16K 15/06* (2006.01)
(52) U.S. Cl. .............. 137/543.23; 137/533.25
(58) Field of Classification Search ............ 137/533.25, 137/543.23
See application file for complete search history.

(56) References Cited

U.S. PATENT DOCUMENTS

| | | | | |
|---|---|---|---|---|
| 170,974 A | * | 12/1875 | Westwater | 137/543.23 |
| 384,514 A | * | 6/1888 | Dowson et al. | 137/533.25 |
| 693,133 A | * | 2/1902 | Hennebohle | 137/533.25 |
| 1,013,093 A | * | 12/1911 | Reeve | 137/543.23 |
| 1,470,018 A | * | 10/1923 | Love et al. | 137/533.25 |
| 1,828,697 A | * | 10/1931 | Yardley | 137/543.23 |
| 1,950,575 A | | 3/1934 | Smolensky | |
| 2,134,803 A | * | 11/1938 | Rose | 137/543.23 |
| 2,356,360 A | | 8/1944 | Smolensky | |
| 2,377,938 A | * | 6/1945 | Hoffman | 137/543.23 |
| 2,447,729 A | | 8/1948 | Bertea | |
| 3,035,604 A | * | 5/1962 | Portis | 137/543.23 |
| 4,215,717 A | * | 8/1980 | Trosch | 137/533.25 |

FOREIGN PATENT DOCUMENTS

JP   10 30743   2/1998

* cited by examiner

*Primary Examiner*—John Rivell
(74) *Attorney, Agent, or Firm*—Kenyon & Kenyon LLP

(57) ABSTRACT

An inlet, a valve chest having a diameter larger than that of the inlet, and an outlet are formed in a valve casing. An annular valve seat is formed between the inlet and the valve chest. A valve element for opening and closing the annular valve seat is disposed within the valve chest. A valve stem is projectingly provided on the inlet side of the valve element. A guide member with which an outer periphery of the valve stem comes into sliding contact is provided at inner ends of ribs which project into the valve chest from an inner wall of the inlet. A recess is formed in the valve element to receive therein the ribs projecting to the valve element and also to receive the guide member.

1 Claim, 2 Drawing Sheets

CHECK VALVE

FIELD OF THE INVENTION

The present invention relates to a check valve to be mounted to a pipe to permit the flow in one direction of a fluid but cut off the flow in the opposite direction of the fluid. Particularly, the present invention is concerned with a check valve provided with a guide member for guiding a valve element in an axial direction of an annular valve seat.

BACKGROUND OF THE INVENTION

An example of a check valve provided with a guide member for guiding a valve element in an axial direction of an annular valve seat is disclosed in Japanese Published Unexamined Patent Application No. Hei 10-30743. In this check valve, an inlet, a valve chest having a diameter larger than that of the inlet, and an outlet are formed in a valve casing, an annular valve seat is formed between the inlet and the valve chest, a valve element for opening and closing the annular valve seat is disposed within the valve chest, a valve stem is projectingly provided on the inlet side of the valve element, ribs projecting from an inner wall of the inlet are formed within the inlet, and at inner ends of the ribs is formed a guide member with which an outer periphery of the valve stem is in sliding contact.

In the above conventional check valve, since the ribs with the guide member formed at the inner ends thereof are positioned within the inlet, there has been the problem that a fluid passing area around the ribs and the guide member is small and that therefore the flow rate is small.

Taking note of the above problem of the prior art, the present invention, as a technical object thereof, aims at providing a check valve which permits a large flow rate by increasing the fluid passing area around the ribs and the guide member.

SUMMARY OF THE INVENTION

According to the present invention, there is provided a valve casing, the valve casing being formed with an inlet, a valve chest having a diameter larger than that of the inlet, and an outlet; an annular valve seat formed between the inlet and the valve chest; a valve element disposed within the valve chest to open and close the annular valve seat; a valve stem projectingly provided on the inlet side of the valve element; and a guide member with which an outer periphery of the valve stem is in sliding contact, characterized in that the guide member is provided at inner ends of ribs which project into the valve chest from an inner wall of the inlet and that a recess is formed in the valve element to receive therein the ribs projecting to the valve chest side and also receive the guide member.

In the present invention, since the guide member is provided at the inner ends of the ribs which project into the valve chest from the inner wall of the inlet, the inner end sides of the ribs are positioned within the valve chest which is larger in diameter than the inlet. Therefore, a large fluid passing area around the ribs and the guide member can be ensured, with consequent increase of the flow rate.

DETAILED DESCRIPTION

Figure 1:
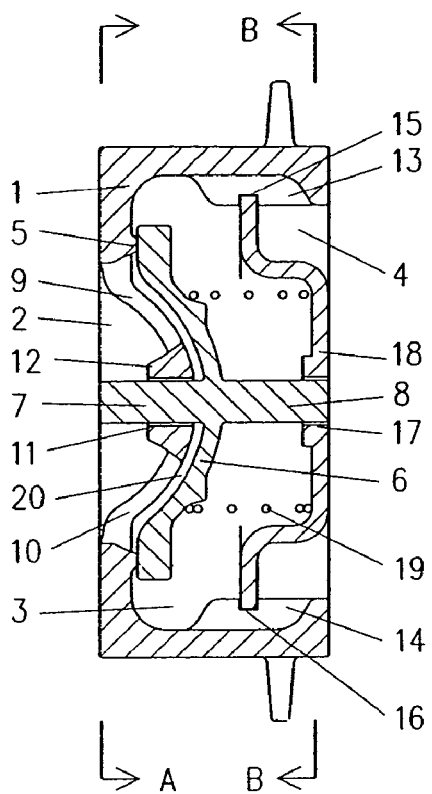
FIG. 1 is a sectional view showing a closed condition of a check valve according to an embodiment of the present invention.
Figure 2:
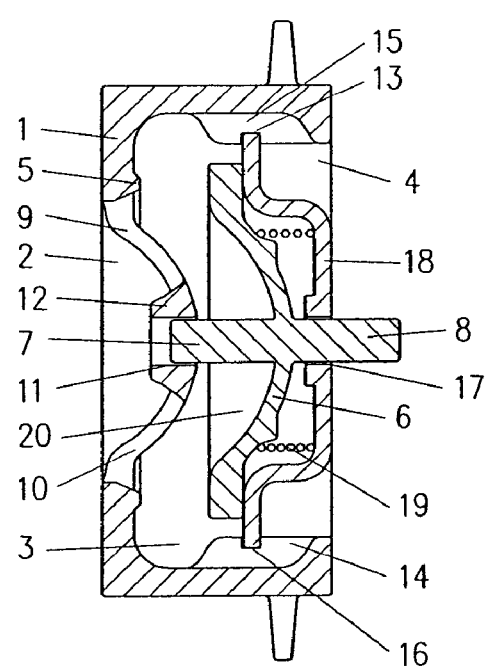
FIG. 2 is a sectional view showing an open condition of the check valve.
Figure 3:
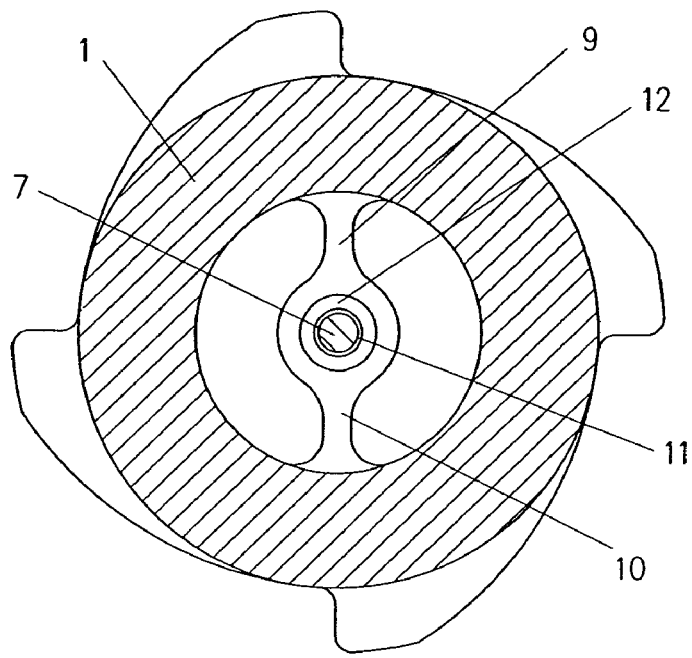
FIG. 3 is a sectional view taken on line A-A in FIG. 1.
Figure 4:
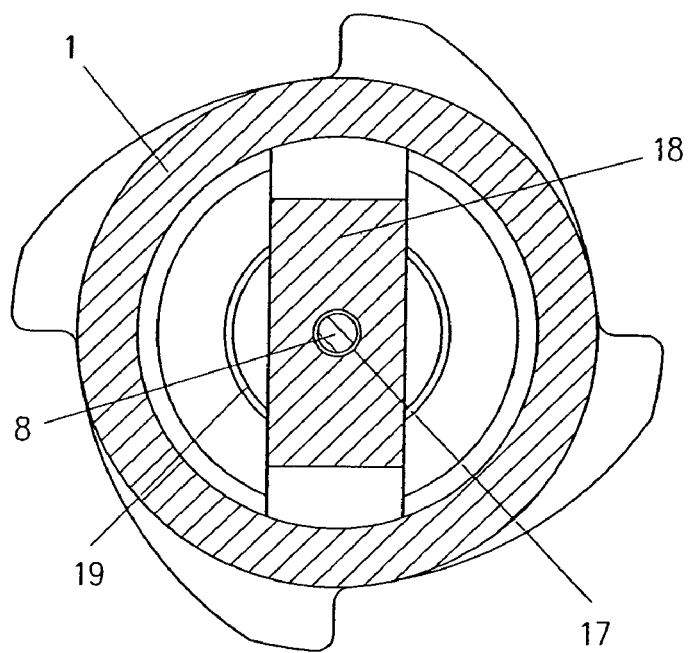
FIG. 4 is a sectional view taken on line B-B in FIG. 1.

As seen in FIG. 1, a valve casing 1 is held grippingly by a clamp device disposed between an inlet-side pipe flange and an outlet-side pipe flange and consisting of bolts and nuts. An inlet 2, a valve chest 3 having a diameter larger than that of the inlet 2, and an outlet 4 are formed in the valve casing 1, and an annular valve seat 5 is provided between the inlet 2 and the valve chamber 3. The inlet 2, valve chest 3, outlet 4, and annular valve seat 5 are formed coaxially.

A valve element 6 for opening and closing the annular valve seat is disposed on the outlet 4 side of the annular valve seat 5. The valve element 6 is integrally provided with a valve stem 7 projecting from the inlet 2 side of the valve element and an outlet-side valve stem 8 projecting from the outlet 4 side of the valve element. Two ribs 9 and 10 projecting into the valve chest 3 from an inner wall of the inlet 2 are formed integrally with the valve casing 1. A guide member 12 having a guide hole 11 along which an outer periphery of the valve stem 7 slides is integrally formed at inner ends of the ribs 9 and 10. The guide hole 11 of the guide member 12 is formed coaxially with the inlet 2. The inner-end sides of the ribs 9 and 10 and the guide member 12 are positioned within the valve chest 3.

Two ribs 13 and 14 are formed on an inner wall of the valve chest 3 so as to be integral with the valve casing 1. Grooves 15 and 16 are formed in the ribs 13 and 14, respectively, and both ends of an outlet-side guide member 18 are fitted in the grooves 15 and 16 to secure the outlet-side guide member 18 to the valve casing 1, the outlet-side guide member 18 having a guide hole 17 along which an outer periphery of the outlet-side valve stem 8 slides. Both-end sides of the outlet-side guide member 18 are bent toward the inlet 2 and are further bent toward the ribs 13 and 14.

The guide hole 17 of the outlet-side guide member 18 is formed coaxially with the inlet 2.

A coiled spring 19 is disposed between the valve element 6 and the outlet-side guide member 18 to urge the valve element 6 toward the annular valve seat 5, i.e., in the valve closing direction. The valve element 6 is centrally curved toward the outlet 4 to form a recess 20. When the valve is closed, the recess 20 receives therein the ribs 9 and 10 projecting toward the valve chest 3 and also receives the guide member 12.

When the fluid pressure in the inlet 2 becomes higher than that in the outlet 4, the valve element 6 displaces itself to the outlet 4 side against the biasing force of the coiled spring 19, so that the fluid present in the inlet 4 passes around the ribs 9, 10 and the guide member 12, then passes around the valve element 6, and flows to the outlet 4. Since the inner-end sides of the ribs 9, 10 and the guide member 12 are positioned within the valve chest 3 which is larger in diameter than the inlet 2, the fluid passing area around the ribs 9, 10 and the guide member 12 is large, thus ensuring a large flow rate. When the fluid pressure in the outlet 4 becomes higher than that in the inlet 2, the valve element 6 undergoes the fluid pressure and also undergoes the action of the coiled spring 19, so that it displaces itself to the inlet 2 side and comes into close contact with the annular valve seat 5, thereby preventing a reverse flow.

In the present invention, as set forth above, since the inner-end sides of the ribs are projected into the valve chest which is larger in diameter than the inlet, there is obtained an outstanding effect that the fluid passing area around the ribs and the guide member can be made large and that therefore a large flow rate can be ensured.

What is claimed is:

1. A check valve, comprising:
   a valve casing, the valve casing being formed with an inlet, a valve chest having a diameter larger than that of the inlet, and an outlet;
   an annular valve seat formed between the inlet and the valve chest;
   a valve element disposed within the valve chest to open and close the annular valve seat, wherein a recess is formed in the valve element on the inlet side;
   a valve stem projectingly provided on the inlet side of the valve element;
   a guide member with which an outer periphery of the valve stem is in sliding contact, the guide member provided at inner ends of ribs that project into the valve chest from an inner wall of the inlet, the recess in the valve element being formed to receive therein the ribs projecting to the valve chest side and also to receive the guide member, the inner ends of the ribs and the guide member being positioned within the valve chest;
   an outlet-side of the valve stem projectingly provided on the outlet side of the valve element; and
   an outlet-side guide member with which an outer periphery of the outlet-side valve stem is in sliding contact;
   characterized in that
   the length of the valve stem is equal to the distance between the valve inlet and the valve outlet in the valve casing; and
   the outlet-side of the valve stem projects out of the valve casing when said check valve is in the fully open position.

* * * * *